United States Patent [19]

Stary

[11] 4,154,464
[45] May 15, 1979

[54] TUBE HOLDING MEANS IN A HEAT EXCHANGER

[76] Inventor: Walter E. Stary, P.O. Box 205, Costa Mesa, Calif. 92627

[21] Appl. No.: 153,763

[22] Filed: Jun. 16, 1971

[51] Int. Cl.$^2$ ............................................. F16L 39/00
[52] U.S. Cl. ............................... 285/137 R; 29/157.4; 72/68; 165/178; 285/222
[58] Field of Search ............... 285/222, 382.4, 382.5, 285/399, 20, 19, 137 R; 29/157.4, 523, 157.3 C; 165/178, 173, 177, 81, 82, 11

[56] References Cited

U.S. PATENT DOCUMENTS

| | | | |
|---|---|---|---|
| 405,225 | 6/1889 | Schaubel | 285/222 |
| 405,226 | 6/1889 | Schaubel | 29/157.5 |
| 1,718,048 | 6/1929 | Jacobus | 122/302 |
| 1,881,867 | 10/1932 | Nelson | 285/222 X |
| 1,951,833 | 3/1934 | Maupin | 29/157.5 |
| 1,988,418 | 1/1935 | German | 285/222 |
| 2,080,374 | 5/1937 | McAllister | 285/222 X |
| 2,134,311 | 10/1938 | Minor et al. | 166/315 |
| 2,217,000 | 10/1940 | Barnes | 285/222 |
| 2,252,274 | 8/1941 | Rossheim et al. | 285/382.4 |
| 2,526,025 | 10/1950 | Hoeppe | 727/119 |
| 2,543,007 | 2/1951 | Fitzgerald et al. | 72/126 |
| 2,737,996 | 3/1956 | Toth | 29/243.52 |
| 2,772,716 | 12/1956 | Stary | 72/123 |
| 2,835,308 | 5/1958 | Stary | 72/126 |
| 2,835,309 | 5/1958 | Wallace | 72/123 |
| 3,016,944 | 1/1962 | Stary | 72/123 |
| 3,317,222 | 5/1967 | Maretzo | 285/222 X |
| 3,428,338 | 2/1969 | Corwin | 285/222 X |

FOREIGN PATENT DOCUMENTS

| | | | |
|---|---|---|---|
| 660474 | 5/1938 | Fed. Rep. of Germany | 285/222 |
| 567948 | 12/1923 | France. | |
| 455785 | 3/1950 | Italy | 285/382.4 |
| 680620 | 1/1965 | Italy | 285/382.4 |
| 40370 | 7/1907 | Switzerland | 285/222 |
| 15217 of | 1885 | United Kingdom. | |
| 774 of | 1890 | United Kingdom | 85/222 |
| 773578 | 5/1957 | United Kingdom. | |

*Primary Examiner*—Thomas F. Callaghan
*Attorney, Agent, or Firm*—Lyon & Lyon

[57] ABSTRACT

In a heat exchange apparatus, a tube holding means for providing an improved tube joint between each tube end and its tubesheet in which each tube end is expanded to become an interference fit in one of the tube containing apertures of the tubesheet. The defining surface of each tube containing aperture includes novel metal collecting portions which act to prevent a linear extension of the tube and thereby reduce undesirable stress concentrations in the tube after expansion. The forming apparatus includes a tapered driving mandrel and a plurality of oppositely tapered rolls carried in a roll cage circumferentially around the mandrel for radial movement by the mandrel against the surface defining the tube containing aperture. In forming the tube holding means the metal collecting portions are roll formed and the defining surface of the tube containing aperture is worked to improve its bonding characteristics.

4 Claims, 6 Drawing Figures

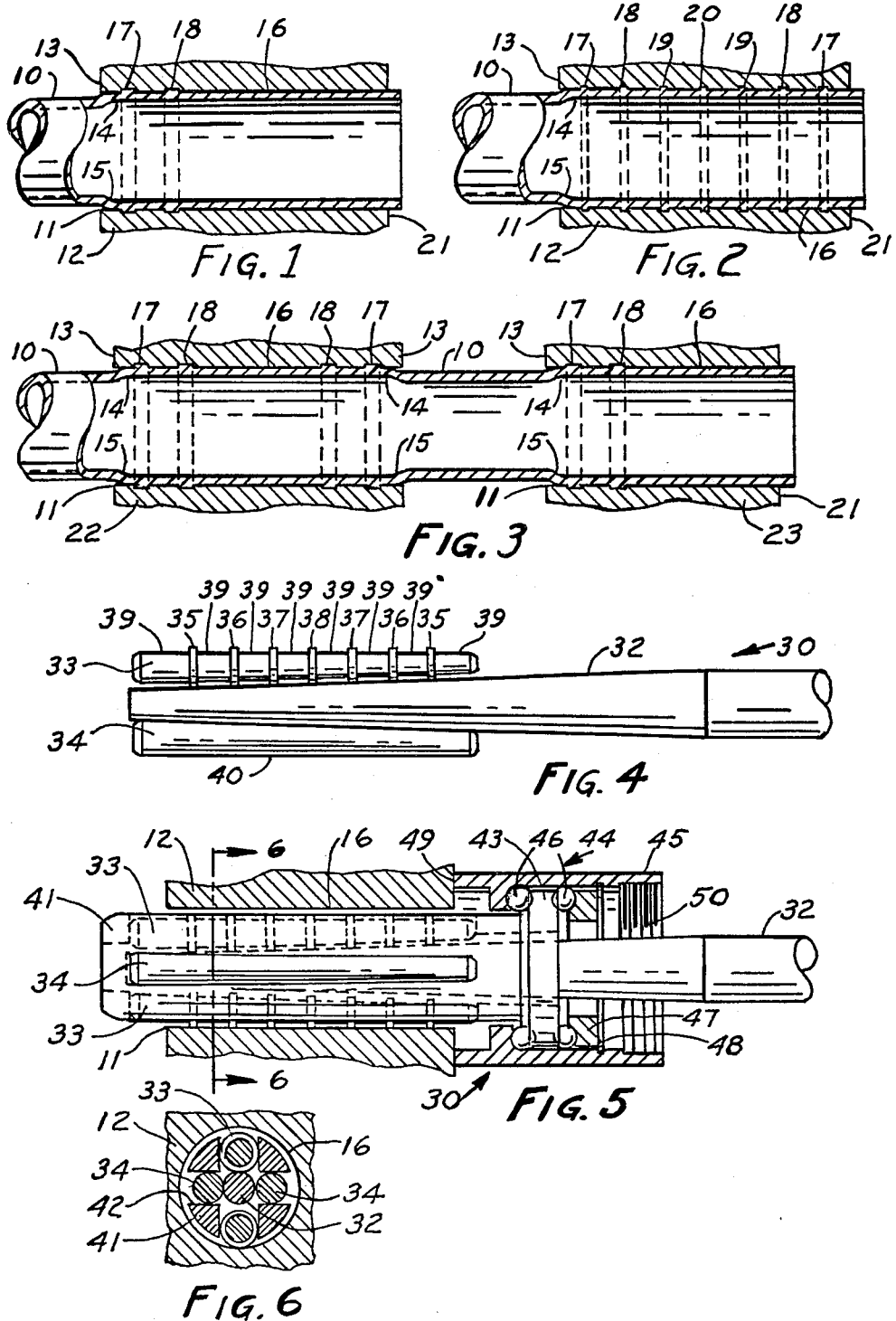

TUBE HOLDING MEANS IN A HEAT EXCHANGER

This invention relates to a tube holding means in a heat exchange apparatus and more particularly relates to a means for providing an improved tube joint between a tubesheet and the end of each heat exchange tube which is rolled and expanded into an interference fit with the tubesheet. This invention also relates to the apparatus and method for forming the tube holding means.

In a heat exchange apparatus it is necessary to secure each end of a multitude of heat exchange tubes to their tubesheets. Each tube must be properly positioned and assembled for maximum fluid tightness to prevent leakage between the tube and the tubesheet. In forming this bond between each tube and the tubesheet, each tube end is placed in a tube hole of the tubesheet and expanded to establish the proper interference fit between the tube end and the surface of the tube hole. Certain methods and apparatus found to be particularly desirable for expanding such tubes are shown in my U.S. Pat. No. 2,690,205, entitled Method and Apparatus For Expanding Tubes; my U.S. Pat. No. 2,772,716, entitled Tube Expanding Tool; my U.S. Pat. No. 2,835,308, entitled Tube Expanding Tool Having Rollers Confined In Cage Slots And Inclined Within Range Of One-Fourth To Two-Thirds Of One Degree; my U.S. Pat. No. 3,016,944, entitled Tube Expanding Device; and my U.S. Pat. No. 3,585,701, entitled Apparatus For Expanding Tubes.

The expanding of each tube involves cold working the tube metal to enlarge its circumference. The portion of the tube being expanded may be compared to a strip of metal whose length is the same as the original circumference of the tube. The expanding tool thins and lengthens this strip of metal by the cold working action. Thus, the tube increases in circumference and diameter, becoming larger than the tube hole, and the tube joint is thereby made pressure tight. However, as the tube is being expanded radially by the tube rolling tool, it is also being expanded axially, That is, as the tube diameter increases to approach the interference fit condition, a component of the tube metal flow moves longitudinally to produce an extrusion of the tube metal out both ends of the tube hole. This increase in the length of the tube at the outer face of the tubesheet is usually not critical, but the increase in length of the tube beyond the inner face of the tubesheet is significant in those situations where straight tubes are used and they are anchored at the other end to another tubesheet or in those situations where double tubesheets are employed.

When the heat exchanger includes tubesheets at both ends of straight tubes a variety of stresses are induced into the tubes and the tubesheets as the tubes are expanded into the second tubesheet. When expanding the tubes into the second tubesheet, it is customary to first tie the second tubesheet into its correct position by expanding some of the tubes around the perimeter of the tube field. Then, espescially when the tube field contains many tube holes, it is customary to expand some tubes in the center of the tube field, or the center horizontal and vertical rows of tubes in the tube field may be expanded to help tie the second tubesheet in its proper position. As the work proceeds and the balance of the tube ends are expanded, a variety of stresses are set up between the tubes and the tubesheets by the inward axial extrusion of the tube metal as the tubes are individually and progressively expanded. The completed assembly will have some tubes between the two tubesheets with a maximum compressive stress and some with a maximum tensile stress. These stresses produce pushing and pulling forces tending to warp the tubesheets and to loosen the tube joints causing leaks to occur, thus reducing the useful life of the assembly. In a double tubesheet assembly, where the two tubesheets are spaced relatively close together, similar stresses and reactions are produced and because of the close proximity of the tubesheets the problem may be even more critical.

Therefore, a principal object of this invention is to provide a means which will substantially eliminate the axial extension of the tube when it is expanded into its interference-fit condition in the tubesheet.

Another important object of this invention is to provide a means which will more securely bond each tube to the tube hole surface of the tubesheet.

In accordance with these objects, a tube holding means is provided having a tube containing aperture in the tubesheet in which the tube is expanded to provide an interference fit between the tube and the surface defining the tube containing aperture. Novel metal collecting portions particularly positioned on the defining surface prevent the longitudinal movement of tube metal through the tube hole as the tube is expanded into its interference fit condition.

The exact positioning of the metal collecting portions is critical and therefore another object of this invention is to provide an apparatus which will precisely form the metal collecting portions.

Still another object is to provide a method for forming the tube holding means which will improve the bonding characteristics.

Another object of this invention is the economic formation of the tube holding means.

Other and further objects and advantages of this invention will be made readily apparent by the accompanying drawings and the following detailed description.

In the drawings:

FIG. 1 is a side sectional view showing a tube expanded into a tube hole of the tubesheet and particularly illustrating the position of the metal collecting portions.

FIG. 2 is a side sectional view of a tube expanded into a tube hole of the tubesheet illustrating another form of the invention.

FIG. 3 is a side sectional view showing a tube expanded into the tube hole of a double tubesheet assembly which again illustrates the positions of the metal collection portions.

FIG. 4 is a side elevation illustrating the working components of the apparatus for forming the tube holding means.

FIG. 5 is a side elevation of the apparatus for forming the tube holding means.

FIG. 6 is a cross sectional view taken substantially on the line 6—6 of FIG. 5.

Heretofore, the usual method for forming high quality tube holes in a tubesheet has been to drill and ream the tube holes and then cut one or at the most two annular grooves into the surface of the tubeholes. The grooves are usually about 0.010 inch deep and ⅛th inch wide, and the space between the two grooves, when there are two grooves, is ⅛th or ¼th inch. In tubesheets 2 inches, or less, in thickness the groove or grooves are centered between the outer and inner faces of the tubesheet. In tubesheets more than two inches thick the grooves are positioned so the center of the space between the two grooves is about 1-inch from the outer face of the tubesheet. The groove, or grooves, prevent a leakage path thru the tube joint by interrupting any spiral scratch or indentation which may be produced by the drill or reamer.

In most heat exchange assemblies, as shown in FIGS. 1 and 2, the tubes 10 are expanded substantially across the entire length of the tube hole 11 in the tubesheet 12. This degree of expansion substantially across the entire length of the tube hole is important because it maximizes the grip between the tubesheet and the tube and because it provides a substantially equal stress condition throughout the entire thickness of the tubesheet. However, it is important to note that the tubes 10 are not expanded the entire length of the tubehole 11 in the tubesheet 12. If the tube 10 is expanded throughout the entire length of the tube hole a stress corrosion condition can occur at the inner face 13 of the tubesheet 12 in the plane across the tube where the stress in the tube metal suddenly changes from maximum to zero. To avoid this stress corrosion condition, the maximum expansion of the tube is stopped at 14 approximately ⅛th inch or more in from the inner face 13 of the tubesheet 12, and the portion 15 of the tube, just beyond the point 14 where the maximum expansion of the tube is stopped, is given a gradual fadeout thereby providing a gradual change in stress in the tube metal.

Referring now in detail to FIG. 1, in the present invention, the tube holding means includes a tube hole surface 16 having at least one primary recess or annular groove 17 positioned just inside the position 14 where the maximum expansion of the tube stops. These recesses or grooves so positioned are generally designated as the metal collecting portions. It has been found that with pressure being maintained on the tube wall metal just beyond this primary groove 17 by the rolls of the tube expanding tool (not shown) the path of least resistance for the flow of the tube wall metal, which would normally move axially, is into this groove 17. This groove thus acts as a cavity to trap and contain the tube metal and thereby prevent longitudinal movement of the tube metal beyond said groove 17 during the expansion of the tube into its interference fit condition.

The positioning of the primary groove or recess 17 is considered critical. A second groove or recess 18, while not critical, is preferable. This secondary groove 18 is positioned just inside the primary groove 17 and it helps the primary groove 17 by absorbing a large portion of the extrusion component before it gets to groove 17.

Additional secondary grooves 19, as shown in FIG. 2, may also be preferable in certain instances. These additional grooves or recesses 19 also take a share of the extrusion component and reduce the load on the primary groove or metal collecting recess 17. In this embodiment, all of the grooves may be narrower thus helping to maintain maximum area of contact between the tube and the tube hole surface. In this arrangement, the grooves to the left of the center groove 20 absorb the extrusion component which could lengthen the tube beyond the inner face 13, of the tubesheet and the grooves to the right of the center groove absorb the extrusion component acting to lengthen the projecting tube end on the outer face 21 of the tubesheet. The multiplicity of grooves in this arrangement shown in FIG. 2 also help produce a better tube joint by giving the tube joint more sealing capacity and by giving the tube joint more resistance to a tube end being moved longitudinally by pushing or pulling forces produced by a different metal temperature in adjacent tubes, whether the different temperatures are due to an accidental thermal shock or because of an unavoidable design factor.

In the double tubesheet assembly shown in FIG. 3, it is important to note that the inner tubesheet 22 is provided with a primary metal collecting portion or groove 17 and a secondary groove 18 adjacent to each end of the tube hole 11 whereas the outer tubesheet 23 contains metal collecting portions adjacent only to the inner face 13 side of the tubesheet. The inner tubesheet 22 is provided with a pair of metal collecting portions adjacent to each side because in effect each face is an inner face 13 and an extension of the tube in either direction will result in the undersirable stresses.

In assemblies having thick tubesheets which require two or more steps of expanding to get the desired length of engagement of the tubes in said tubesheets it may be desirable to provide the metal collecting portions or annular grooves for each step of the expanding. If the steps of expanding are to be made progressively inward, starting at the end of the tubes, and the inward extrusion of the tube wall metal is undersirable, grooves 17 and 18 as shown in the outer tubesheet 23 of FIG. 3 should be provided adjacent to the inner end of each step of expanding.

If the steps of expanding in the above described assembly are to be made progressively outward, starting with the first step of expanding at the inner face side of said tubesheet, then the one pair of grooves 17 and 18, as shown in said outer tubesheet 23, properly positioned near the inner face of said tubesheet are sufficient if the outward extrusion of the tube wall metal is not objectionable.

If the extrusion of the tube wall metal in either direction is undesirable and the steps of expanding in said above assembly are to be made progressively outward, starting with the first step of expanding at the inner face of said tubesheet, then the two pair of grooves 17 and 18 as shown in the inner tubesheet 22 of FIG. 3 should be provided for said first step of expanding and then an outer pair of grooves 17 and 18 should be provided at the outer end of each additional step of expanding.

The exact width of the metal collecting portions or annular grooves and the exact longitudinal spacings between the grooves for the best possible tube joint will vary according to the operating pressure and temperature, the types of metal in the tubes and tubesheets, and the other operating conditions. However, in each instance a primary metal collecting portion or groove 17 will be positioned just inside the position where the maximum expansion of the tube stops adjacent to the inner face side of the tubesheet.

This invention is also directed to an improved apparatus and novel method for forming the tube holding means which thus provides for an improved tube joint. The apparatus and method of this invention improve the quality of the tube joint and at the same time reduce the manufacturing costs. The above tube holding means can be formed according to various methods and by various apparatus, including a one or two groove grooving tool. However, if the cutter portions of such a grooving tool are ground to cut the narrow grooves as shown in FIG. 2, said narrow cutter portions are more likely to break. Moreover, cutting to form the grooves produces chips which can foul the tool action and if a plurality of grooves are cut the probability of chips fouling the tool action is increased.

Therefore, the method of this invention for producing the improved tube holding means includes producing the metal collecting portions or grooves by moving or roll forming the metal and thereby eliminating the normal cutting action which creates chips. It is also a part of this method to produce at the same time an entire series of grooves in one operation by moving the metal. A further part of this method is to give a burnished finish to the surface 16, the portion of the tube containing aperture between and beyond the metal collecting portions thereby eliminating the need for a prior reaming operation.

The working components of the apparatus, generally designated 30, for forming the tube holding means are illustrated in FIG. 4. These working components comprise a tapered driving mandrel 32 and a combination of oppositely tapered rolls. Preferably, these components include a pair of grooving rolls 33 and a pair of burnishing rolls 34, all with the same taper. The grooving rolls 33 include a plurality of metal moving means or ridges 35, 36, 37 and 38 with the circumferential surface of the ridges having the same taper as is on the burnishing rolls. Thus the rolls produce cylindrical surfaces and the formed metal collecting portions or grooves are all the same depth.

The surface 39 portions of grooving rolls 33 may be used to help burnish the tube hole surface 16 between the grooves if these portions of the grooving rolls 33 are exactly the groove depth less in diameter than the diameter of burnishing rolls 34 at any identical longitudinal position on both rolls. If said portions of the grooving rolls 33 are more than the groove depth smaller in diameter the surface 39 portions of said grooving rolls will not contact the tube hole surface.

FIG. 5 shows the apparatus in the tube hole 11 of the tubesheet 12 in position to form the metal collecting grooves and burnish the tube hole surface 16 to produce the tube holding means. The apparatus shown in FIGS. 4, 5 and 6 is adapted to produce the tube holding means shown in FIG. 2 with the ridges 35, 36, 37 and 38 being adapted to form the grooves 17, 18, 19 and 20 respectively. However, with appropriate modifications in the number of ridges, the apparatus can be adapted to form the tube holding means illustrated in FIG. 1 or the tube holding means illustrated in FIG. 3. The assembled apparatus 30 shown in FIGS. 5 and 6 includes a roll cage member 41 which contains the pair of grooving rolls 33 and the pair of burnishing rolls 34. The driving mandrel 32, as shown in FIG. 5, is in its retracted position permitting all rolls to be free and in their retracted positions in their roll slots 42 in the roll cage 41. The arrangement of the rolls and the mandrel is also shown in FIG. 6.

While four rolls are shown, it should be pointed out that three rolls are the minimum required. However, with three rolls, the burnishing of the tube hole surface is accomplished by the portions of the rolls between the ridges and each roll has ridges. The four roll arrangement shown in the drawings is generally advantageous because different sets of burnishing rolls having slightly different diameters may be used with one set of grooving rolls to thus get slightly different depth grooves. The grooves may thus be made the most appropriate depth for the type of metals in the tubesheets and tubes and the degree of interference fit to be produced in the final tube joint. Another advantage of the roll cage with separate burnishing rolls is that the burnishing rolls have full length contact with the mandrel thus permitting a more rapid and powerful burnishing action when such is desired.

The flange 43 on the rear end of the roll cage 41 serves as the floating member of a double acting thrust bearing assembly generally designated 44, and comprised of the flange 43, housing member 45, the two sets of ball-bearing balls 46, back up ring 47, and retaining ring 48. The front face 49 of housing 45 bears against the outer face of tubesheet 12 to thus serve as a measuring or positioning gage to properly position the apparatus 30 in a tube hole so as to form the grooves in the correct axial or longitudinal positions.

The internal thread 50 in the rear end of housing 45 serves to operably connect said housing and its roll cage and rolls to the tool driving mechanism (not shown). Mandrel 32 is connected to said tool driving mechanism by means not shown so that said mandrel is rotated, advanced and retracted, with all of said movements powered and controlled by said tool driving mechanism.

The following sequence of steps produces the tube holding means of the present invention. With the apparatus 30 properly positioned in a tube hole 11 of the tubesheet 12 to be processed, the work cycle is initiated and the mandrel 32, while being power rotated, is advanced to thus move the grooving rolls 33 and the burnishing rolls 34 radially outward until the ridges 35-38 on the grooving rolls 33 contact the tube hole surface 16. The roll cage starts rotating as the friction contact between the ridges on grooving rolls 33 and the surface of mandrel 32 is developed. The continued advancing of the mandrel 32 forces the rotating grooving rolls 33 radially outward and develops pressure on the portions of the tube hole surface 16 in contact with the ridges on said grooving rolls 33.

The resistance to the radial movement of the grooving rolls produces a resistance to the continued advancing of the mandrel and therefore the powered means advancing the mandrel 32 develops a greater force to advance the mandrel at the proper speed to develop the metal flow action and thereby form the metal collecting grooves. As the mandrel advances and the grooving and burnishing rolls move radially outward, the grooves being formed continue to deepen until the burnishing rolls 34 come into contact with the tube hole surface 16.

With the additional rolls now exerting pressure on the tube hole surface, more force is applied to advance the mandrel. The mandrel advance is then controlled to get the desired amount of burnishing of the tube hole surface. The work cycle is then terminated and the mandrel is retracted. The apparatus can then be moved to another tube hole and the cycle repeated.

Having fully described my invention, it is to be understood that I do not wish to be limited to the details herein set forth, but my invention is of the full scope of the appended claims.

I claim:

1. In a heat exchange apparatus having at least one double tubesheet assembly with two tubesheets spaced relatively close together and with tubes extending beyond each face of one tubesheet and expanded within the tube holes of said tubesheets for connection therewith, an improved connection between said tubes and said tubesheets, comprising:

a maximum radially-expanded portion of each of at least a plurality of said tubes within the encircling tube holes of said one tubesheet which terminates at one end within each said encircling tube hole at a cylindrical surface thereof and adjacent one face of said one tubesheet and terminates at the other end within each said encircling tube hole at a cylindrical surface thereof and adjacent the other face of said one tubesheet; and metal collecting means for each of said plurality of tubes including about the surface of each said encircling tube hole of said one tubesheet a primary annular recess adjacent each face of said one tubesheet and adjacent and inward of each termination of said maximum radially-expanded portion of the tube therein which traps and collects tube metal to thereby avoid non-uniform axial stresses in said plurality of tubes between said one tubesheet and said other tubesheet created by the expansion of said plurality of tubes within said encircling tube holes of said one tubesheet.

2. The connection of claim 1, wherein each said primary recess is spaced between about 1/32nd and ¼th of an inch inward from said adjacent termination of said maximum radially-expanded portion of said tube.

3. The connection of claim 1, wherein said metal collecting means includes about each encircling tube hole surface of said one tubesheet and between said primary recesses at least one secondary annular recess.

4. The connection of claim 3, wherein said secondary annular recess about each said encircling tube hole surface is spaced between about ¼th and ½ an inch from one of said primary annular recesses.

* * * * *